Aug. 26, 1947.    P. F. McDERMOTT    2,426,405
FILTER ELEMENT
Filed Sept. 4, 1943

INVENTOR
PAUL F. McDERMOTT.
BY
Virgil P. Kline
ATTORNEY

Patented Aug. 26, 1947

2,426,405

UNITED STATES PATENT OFFICE 2,426,405

FILTER ELEMENT

Paul F. McDermott, Martinsville, N. J., assignor to Johns-Manville Corporation, New York, N. Y., a corporation of New York Application September 4, 1943, Serial No. 501,221

8 Claims. (Cl. 183—47)

The instant invention relates to improved filters or filtering elements, particularly those employed for the removal of solid or liquid particulate matter, such as dust, dirt, smoke, tars, oils, etc., from air and other gases. Filters and filtering elements in accordance with the invention are adapted for air conditioning apparatus, respirators and the like and for numerous industrial uses, the invention not being restricted to any particular application.

The principal object of the invention is to provide an efficient filter, particularly for the removal of particulate matter from gases, the filter being of a character to combine high efficiency of particle removal with low resistance to flow of air or other gas. An additional object is to provide a filter which does not require elaborate supporting elements.

Another object of the invention is the provision of a filter element formed of a layer or layers cut from a resilient, felted mat, preferably composed of mineral wool fibers. It will be understood that the term "mineral wool fibers" as employed herein is used in a generic sense to include fibers formed of rock, slag, glass, mixtures thereof and other such raw materials.

A further object of the invention is the provision of a filter element of the type referred to in which the resilient, felted layers are maintained under compression by forces acting transversely to the faces of the layers. This feature imparts mechanical stability to the construction, and assists, at least, in preventing leakage of air between the filtering body and the imperforate heads or other supporting elements of the filter unit. In addition compression of the layers serves to equalize the size of the pores or voids between fibers whereby the element has a substantially uniform filtering action throughout. Also the size of the voids can be controlled to a substantial extent by controlling the degree of compression to which the felts are subjected.

A still further object of the invention, in one form thereof, is the provision of a filtering element of the type described including a plurality of superposed rings or ring-like sections of any desired contour, with the assembled sections providing one or more interior passages through which either the filtered gas or the gas to be filtered, depending upon the direction of flow, may be passed.

My invention will be more fully understood and further objects and advantages thereof will become apparent when reference is made to the more detailed description thereof which is to follow and to the accompanying drawings, in which Fig. 1 is a perspective view, with parts broken away for clearness of illustration, depicting a tubular filter in accordance with the invention;

Figure 1:
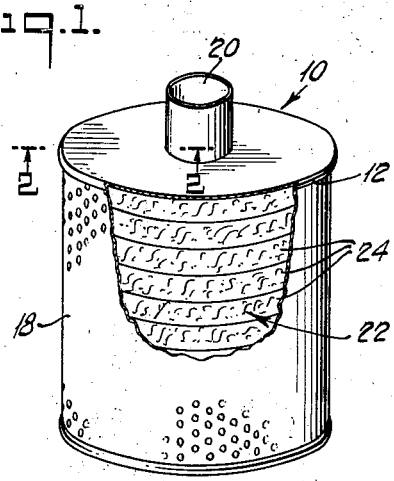
Figure 3:
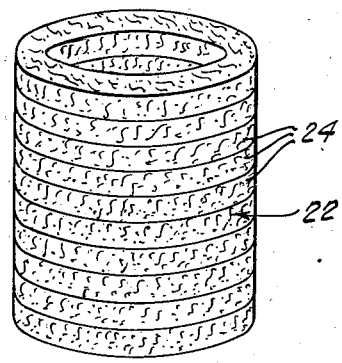
Fig. 3 is a perspective view of a filtering element illustrating its composition.
Figure 2:
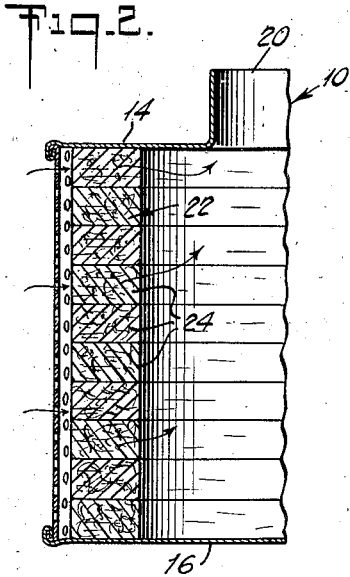
Fig. 2 is a sectional view on an enlarged scale taken on a line 2—2 of Fig. 1.

Referring now to the drawings, and more particularly to Figs. 1-3, there is shown a filter or unit 10 of a type particularly adapted for respirators or the like. It will be understood that this particular design has been selected only for purposes of illustration and that the unit may take many different forms. The unit 10 comprises a cylindrical hollow body member 12 including end members 14 and 16 and an outer wall 18. One of the end members, for example end member 14, may include a nipple 20 secured thereto and communicating with the interior of body 12. End members 14 and 16 may be formed of any suitable gas impervious material, such as sheet metal, wood, plastic or the like. Wall 18 is suitably formed to permit the passage of the gas to be filtered. Preferably wall 18 is of a foraminous character, for example, it may be formed of a wire mesh screen, perforated metal sheet or the like.

Figure 4:
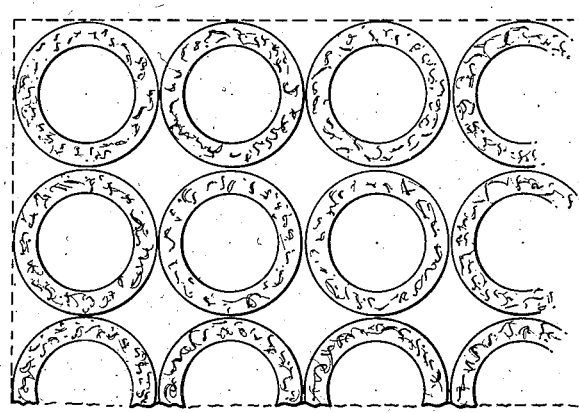
Fig. 4 is a plan view of a felt of fibrous material depicting the manner in which sections may be cut therefrom to make up the filtering element.

The filtering element which serves to remove particulate matter from a gas is illustrated at 22 and, in accordance with the instant invention, comprises one or more layers 24 of a resilient felted fibrous material. For this purpose there is preferably used a mineral wool mat formed by a known dry felting process, as illustrated, for example, in the Powell reissue patent Re. 22,090, issued May 5, 1942, the mat consisting of fibers lying predominantly in planes generally parallel to the faces of the mat. A set or hardened binder, such as an asphalt, resin, drying oil or the like or mixtures thereof, is interspersed throughout the fibrous mat to maintain the fibers in their felted relationship and to impart resilient characteristics to the mat. Referring to Fig. 4, the sections or layers 24 are cut from the mat so that the flat faces of the sections constitute portions of the upper and lower faces of the mat. Hence the fibers lie predominantly in planes substantially parallel to the faces of the sections. The thickness of the sections is determined by the thickness of the felt which may be controlled as desired to meet specific requirements. In any event the combined thickness of the superposed sections is such that the element is under substantial compression between heads 14 and 16. One or more of the sections may be employed to make up the element, but preferably a substantial number are used, as illustrated in Figs. 1, 2 and 3.

The sections 24 may be of any suitable configuration and, particularly when employed in a unit of the type shown in Fig. 1, they are of ring-like formation to define a central bore in alignment with nipple 20. The width of the sections, that is, the distance between the inner and outer annular surfaces may be selected to meet the requirements of the particular situation in which the filter is to be employed.

In the operation of the filtering element the gas to be filtered comes into contact with the face of the filter exposing the cut edges of the sections and is forced or drawn through the numerous fine voids in the felted fibrous material whereby the particulate matter is filtered out. Where the filtering element is employed in a unit as shown at 10 of Fig. 1, the gas preferably passes through the foraminous wall 18 of the casing, is cleaned as it penetrates the pores of the element 22 and then enters the central bore and passes out through nipple 20. However, if desired, the gas may pass in the opposite direction through the filter.

Figure 5:
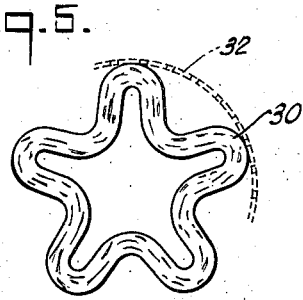
Fig. 5 is a plan view of a filter section of modified form.
Figure 6:
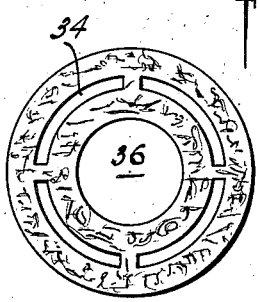
Fig. 6 is a plan view of a filter section depicting a further modification.

Although one particular construction of the filtering element is illustrated in Fig. 1, it will be understood that it may be made in different forms and designs to meet specific needs. In the form of Fig. 5 the section approximates a star shape whereby the area exposed to the gas is greatly increased. Also, in this and other irregular forms the points or extending portions 30 may contact a wall of the container or unit, as illustrated fragmentarily at 32 in Fig. 5, to increase the mechanical stability of the structure. Fig. 6 depicts a further modification in which each section is provided with cut-outs 34 which, when the sections are superposed, define elongated passageways through the element. In this form of the device the gas may enter the filter from the space surrounding the element and also from the bore 36 and be withdrawn through these elongated passageways. Alternatively the gases may be introduced through the passageways and pass in both directions through the filter.

A filter or filtering element in accordance with the invention, as described above, meets all of the several objects previously set forth. Due to the fact that the sections are formed of a resilient, felted fibrous material and are maintained under compression by forces acting transversely to the planes of the predominant number of fibers, the element has substantial structural stability. Also compression of the material, which may be controlled as desired, tends to reduce the size of the passageways or pores in the felt and to insure uniformity throughout the filter. In addition, the compressed, resilient material forms a good seal against the end walls of the container or other device in which it is employed. The built-up character of the element lends itself to ready modification to meet varying size and capacity requirements.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A filtering element for the removal of particulate matter from gases, said element comprising a plurality of superposed layers, each comprising a resilient mineral wool felt with the fibers thereof arranged predominantly in planes parallel to the contiguous faces of said layers and maintained in felted relationship by a set binder, and means acting transversely to the faces of said layers, maintaining said superposed layers under compression.

2. A filtering element for the removal of particulate matter from gases, said element comprising a plurality of superposed ring-like sections of irregular contour formed of a resilient, felted mineral wool, the fibers of said sections lying predominantly in planes generally parallel to the contiguous faces of said sections and maintained in felted relationship by a set binder, and means maintaining said superposed section under compression, said means acting in a direction at substantiallly right angles to the contiguous faces of said sections.

3. A filter comprising a casing including opposed heads, a filtering element interposed between said heads, said filtering element comprising a compressed, resilient layer of felted mineral wool fibers with the fibers thereof lying predominantly in planes generally parallel to said heads and maintained in felted relationship by a set binder, said heads maintaining said layer under compression.

4. A filter comprising a casing including spaced heads, a foraminous outer wall connecting said heads, a filtering element interposed between said heads, said element comprising a plurality of compressed, superposed ring-like elements of felted mineral wool fibers and an interspersed binder maintaining the fibers in felted relationship, the fibers of said elements lying predominantly in planes generally parallel to the faces of the elements, said element including projections in contact with said outer wall.

5. A filtering element comprising a plurality of superposed, compressesd layers of felted, mineral wool fibers with the fibers thereof lying predominantly in planes generally parallel to the faces of the layers and maintained in felted relationship by a set binder, said element including gas conducting passageways extending therethrough in a direction transverse to said layers.

6. A filtering element for the removal of particulate matter from fluids, said element comprising a layer cut from a felted, fibrous sheet with the fibers lying predominantly in planes generally parallel to the faces of the sheet, said layer having its cut edge exposed to the fluid to be filtered.

7. A filtering element for the removal of particulate matter from fluids, said element comprising a compresssed, resilient layer of felted mineral wool fibers with the fibers thereof lying predominantly in planes generally perpendicular to the face of the element exposed to the fluid to be filtered.

8. A filtering element for the removal of particulate matter from fluids, said element comprising a plurality of superposed, ring-like sections of resilient, felted mineral wool, the fibers of said sections lying predominantly in planes generally parallel to the contiguous faces of said sections, and means maintaining said superposed sections under compression.

PAUL F. McDERMOTT.

REFERENCES CITED

The following references are of record in the file of this patent:

UNITED STATES PATENTS

| Number | Name | Date |
|---|---|---|
| 437,443 | Mertz | Sept. 30, 1890 |
| 2,016,993 | Dollinger | Oct. 8, 1935 |
| 2,134,601 | Campbell | Oct. 25, 1938 |
| 779,548 | Kiefer | Jan. 10, 1905 |

FOREIGN PATENTS

| Number | Country | Date |
|---|---|---|
| 117,218 | Australia | July 15, 1943 |
| 766,983 | France | July 7, 1934 |